Nov. 18, 1958  D. M. BRUCE ET AL  2,860,548
FLUID PRESSURE OPERATED MULTILINEAR SERVO-SYSTEMS
Filed Nov. 29, 1954  12 Sheets-Sheet 5

Fig.3.

Inventors:
Donald Marsh Bruce
and
Robert Harry Burns
By their attorneys:
Baldwin + Wight

Fig. 6.

Nov. 18, 1958    D. M. BRUCE ET AL    2,860,548
FLUID PRESSURE OPERATED MULTILINEAR SERVO-SYSTEMS
Filed Nov. 29, 1954    12 Sheets-Sheet 10

Fig.8.(a)

Inventors:
Donald Marsh Bruce
and
Robert Harry Burns
By their attorneys:
Baldwin & Wight United States Patent Office 2,860,548
Patented Nov. 18, 1958

1

2,860,548

FLUID PRESSURE OPERATED MULTILINEAR SERVO-SYSTEMS

Donald Marsh Bruce, Hatton, near Warrington, and Robert Harry Burns, Penketh, near Warrington, England, assignors to Electro-Hydraulics Limited, Warrington, England, a company of Great Britain Application November 29, 1954, Serial No. 471,850

Claims priority, application Great Britain April 29, 1954

5 Claims. (Cl. 90—13)

This invention relates to fluid pressure-operated systems which can be employed to move a member in more than one linear direction and concerns especially the servo-type of such pressure-operated systems, which type comprises a servo-mechanism including a follow-up device and a valve so arranged that as a control handle is moved by hand the member will copy the movement, the operator feeling that he is moving the member with very little effort although in fact the member is moved by hydraulic power.

This type of servo-system is used, according to this invention, for position control of the member and in a position control servo-mechanism, as is well known, there is an input member, that is to say for example a control handle, and an output or controlled member. To every position of the input member there corresponds an equilibrium position of the controlled member. If the positions of the input and controlled members are not in correspondence, that is to say if there is an error or discrepancy between them, then the servo-mechanism, which is sometimes called an error actuated or closed loop or feedback or follow-up mechanism, operates so that power is directed to the controlled member in such a manner as to bring the controlled member back into correspondence with the input member, thus removing the positional error. The movement of the input member in a given direction, must thus produce movement of the controlled member in the corresponding direction, and this controlled movement must be fed back so that, when the controlled position finally corresponds to the input position, this movement ceases.

The invention will hereinafter be described as applying such a servo-system to a machine tool of the so-called copying type, for example a copying miller or router.

Automatic or semi-automatic machine tools of the copying type, as previously known, usually include at least two fluid pressure-operated motors, normally jacks, and it will be appreciated that to move the work together with its table in one direction, one jack is incorporated on a normally non-operating part, while the other jack is mounted on the moving table in such a way that it caters for movement of the work in a different direction. It should, of course, be understood that the tool could be moved in a similar way, instead of the work on its table.

Machine tools of this type are quite numerous and work satisfactorily. They are, however, very heavy and their installation takes up extensive floor space. The movement possible by the servo-system is also limited from the start by the size of the machine tool and its work by the load on the fluid operated servo by the cut of the tool. Any backlash and/or increased cut by the tool reduces the accuracy of the machine, whilst wear on the bearings also has the same effect, unless rigidity of the whole machine is increased, with a consequent penalty in weight and cost.

Demand at the present time for machine tools of the copying type is so great that it cannot be fully met by the

2 production of new specially designed machine tools, so that there is a large demand for servo-systems which can be incorporated in existing machine tools which are normally not large and rigid enough for incorporation of servo-systems now commonly in use.

It is an object of this invention to overcome this disadvantage and to provide a hydraulic servo-system which can be incorporated in existing machine tools without an excessive increase in size and rigidity.

In a fluid pressure-operated mutilinear servo-system of the type described for controlling movement of a copying or router machine tool, according to the present invention, there are provided two fluid pressure-operated jacks, each including a cylinder, a piston and piston rod slidable therein and a fluid pressure-operating valve for controlling actuation of the jack, a fluid pressure supply for supplying fluid under pressure to each of said jacks through its valve, a spindle on which either the cylinders or the piston rods of each jack are mounted to provide therefor a common pivot, a tool carriage and tool connected to said spindle, operation of the valves moving the jacks to vary the angle therebetween and to cause the cylinders or piston rods to act on the common pivot on said spindle to control through the carriage movement of the tool.

Preferably each jack carries an operating valve, which may be in the form of a slide valve; such valves may be operated in any desired manner and in one form of servo-system the operating valves each consist of a slide valve operated through a mechanical linkage by movement by the operator of an operating handle. Movement of each slide valve admits fluid under pressure to its respective jack cylinder, whereby the jack pistons are caused to move in or out of the cylinders and thus cause movement, through the common pivot member, of the member to be moved.

The control handle may include a "dead-mans" handle grip, when the servo-system is hand operated, which grip provides means whereby the jacks are fluid pressure locked in their positions when the hand is removed from the lever, thus preventing drifting of the fluid pressure operated system by friction in the system or other means.

The servo-system may include an overriding "follow-up" device which preferably includes a stylus for use with a template, which stylus limits the amount of movement of the servo-system.

The invention, as applied to a copying machine tool or copying miller or router, will now be described with reference to the accompanying drawings in which Figures 1a and 1b, taken together, constitute a plan view of the machine with the servo-system, Figures 2a and 2b, taken together, constitute a side view thereof, and Figure 3 a perspective view of the machine on a reduced scale.

Referring to the Figures 1a, 1b, 2a, 2b and 3, on the machine pillars 1, 2, 3, 4 are mounted the machine beds 5, 6, on which slides a machine tool carrier 7. A cutter head 8 is mounted on the carrier 7 and is adapted to slide thereon in a direction transverse to the beds 5, 6. Two operating jacks 9, 10 are provided, the cylinder 11 of the jack 9 being pivotally mounted at 11' (Figure 1a) on a bracket 12 on the pillar 3, whilst the cylinder 13 of the jack 10 is similarly pivoted at 13' on a bracket 14 on the pillar 4. The piston rods 15 and 17 of the jacks 9 and 10 respectively are mounted on a common spindle 16, which forms the common pivotal member referred to above, said spindle 16 being fixed to a bracket 8' fast with the cutter head 8, so that the spindle 16 lies as near as possible on the axis of the tool 21, in order to reduce any load fed back from the tool to the jacks. A manual control lever 19 is provided on the cutter head 8 for raising or lowering, through suitable gearing 19', the tool 21 in relation to a fixed table 20, onto which the material to be machined is fixed. Any other form of means for avoiding blacklash could be used.

Figures 4, 4A:
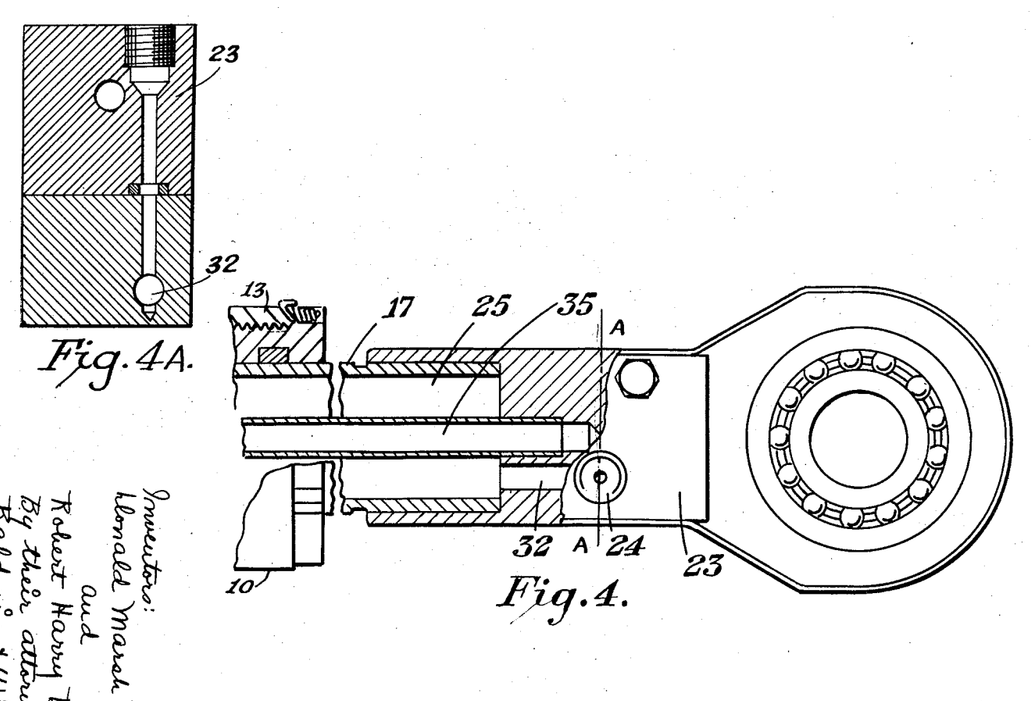
Figures 4 and 5 are part sectional views of a jack and Figure 4a is a section on the line A—A of Figure 4, Figure 6 a diagrammatic hydraulic circuit.
Figure 5:
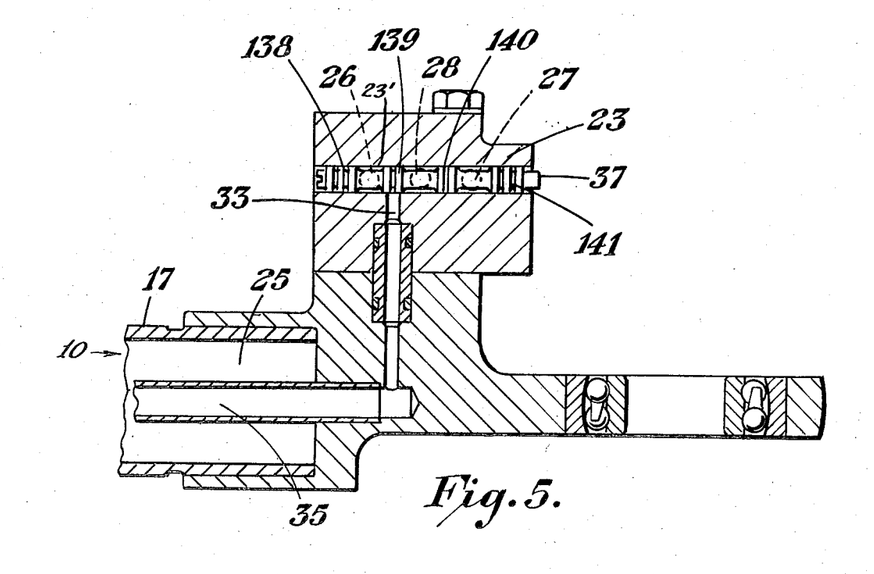
Figure 6:
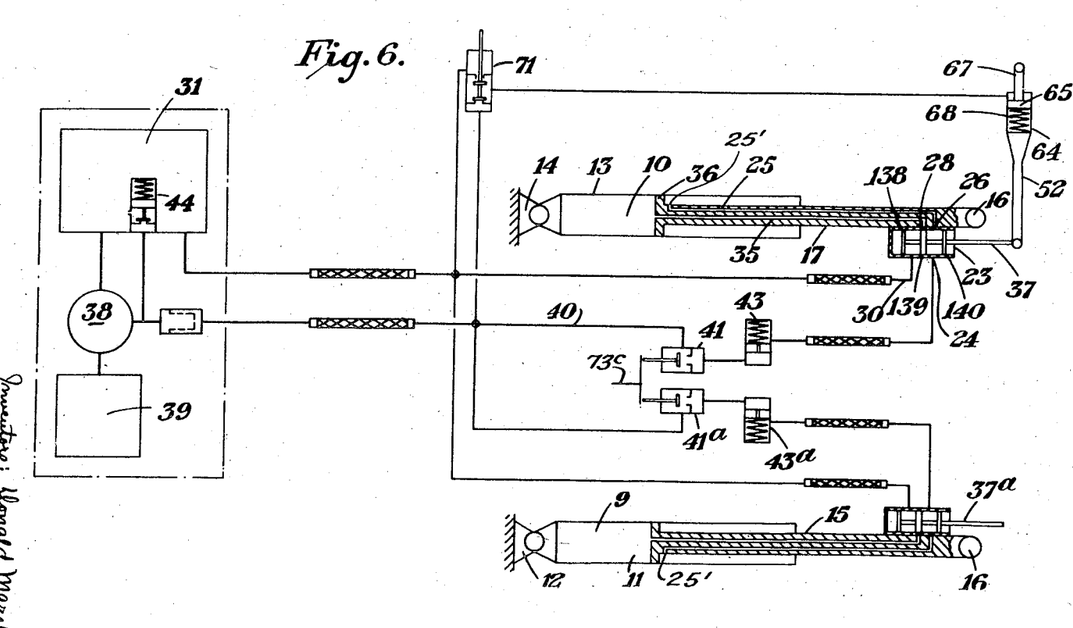

The construction of the operating jacks is more particularly illustrated in Figures 4, 5 and 6; as the two jacks are exactly similar in construction only one will now be described. The jack 10 includes a cylinder 13 and a piston 36 having a hollow piston rod 17 which carries a slide valve, the body 23 of which is provided with an inlet connection 24 for hydraulic pressure provided by a pump 38, which connection 24 leads directly to the annular area of the jack, via an aperture or bore 32 (Figure 4) in the valve body 23, and a bore 25 in the piston rod 17 such bore opening into the adjacent end of cylinder 13 as at 25' (Figure 6). A branch line 28 leads from the connection 24 into the main bore 23' of the valve body 23, whilst apertures 26 and 27 are connected to a return line 30 leading to a tank 31. A further bore or aperture 33 in the valve body 23 is connected to cylinder 13 at the full area side of the piston 36 through a pipe 35 passing through the piston rod 17 and the piston 36, thus allowing fluid pressure to pass into the full area of the cylinder 13. The slide valve includes a piston and piston rod 37 in the bore 23' and is formed with sets of sealing lands 138, 140, 141 (see more particularly Figure 5), and a metering land 139, the land 139, when the slide valve is in the neutral position, covering the aperture 33 as is shown in Figure 5. It will be appreciated that hydraulic fluid on the full area side of the jack piston 36 is hydraulically locked when the side valve is in the neutral position, as shown in Figure 5, thus hydraulically locking the jack. When the land 139 is moved it connects the full area of the jack via bore 33, either to pressure (branch line 28) or to tank through aperture 26. As land 140 is sealing against full supply pressure, the leakage past it may be expected to be large compared with the leakage past land 138. If aperture 27 and land 141 were omitted the leakage past land 140 would be leakage from the fluid system to atmosphere. Aperture 27 is a drain port allowing any leakage past land 140 to be returned to tank. The further sealing land 141, which then has to be introduced has only to seal against tank pressure. As aperture 27 and land 141 are not essential to the operation of the equipment but are only a refinement they have been omitted from the diagrammatic view, Figure 6.

The pump 38 is driven by an electric motor 39, and supplies hydraulic fluid under pressure through a pipe line 40 into normally closed non-return valves 41, 41a coupled to a handle carried by an operating lever to be described in greater detail with reference to Figures 7 and 8a. The line 40 also includes fluid limiting valves 43, 43a respectively limiting pressure to the jacks 10 and 9, whilst a pressure relief valve 44 is also provided in the line 40 in order to limit the pressure in the supply line, excess pressure being relieved by discharging fluid into the tank 31.

Figure 7:
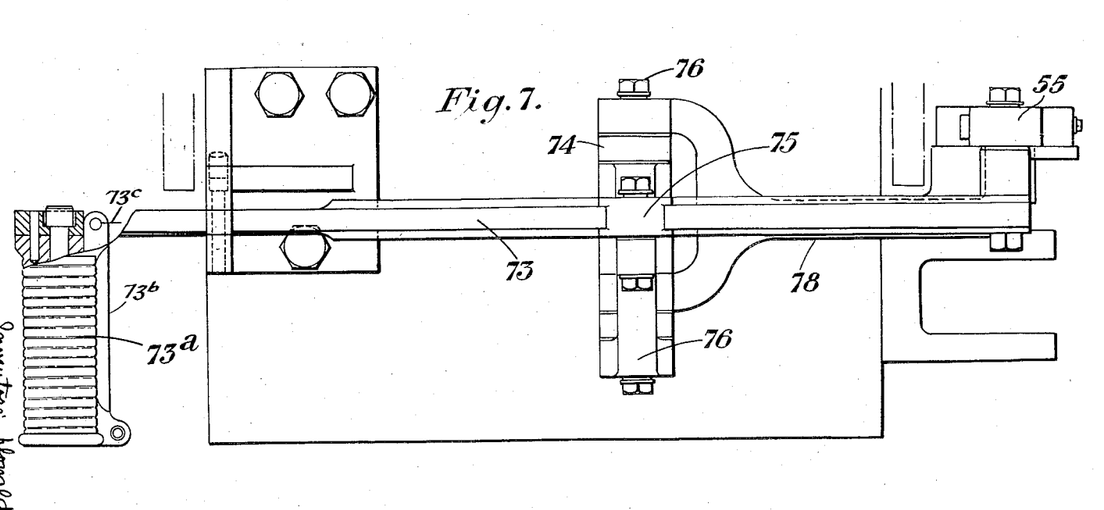
Figure 7 is a side view of the operating mechanical linkage, Figures 8a and 8b, taken together, constitute a plan view of the operating mechanical linkage, and Figure 9 a part sectional view of the follow-up device.
Figure 8A:
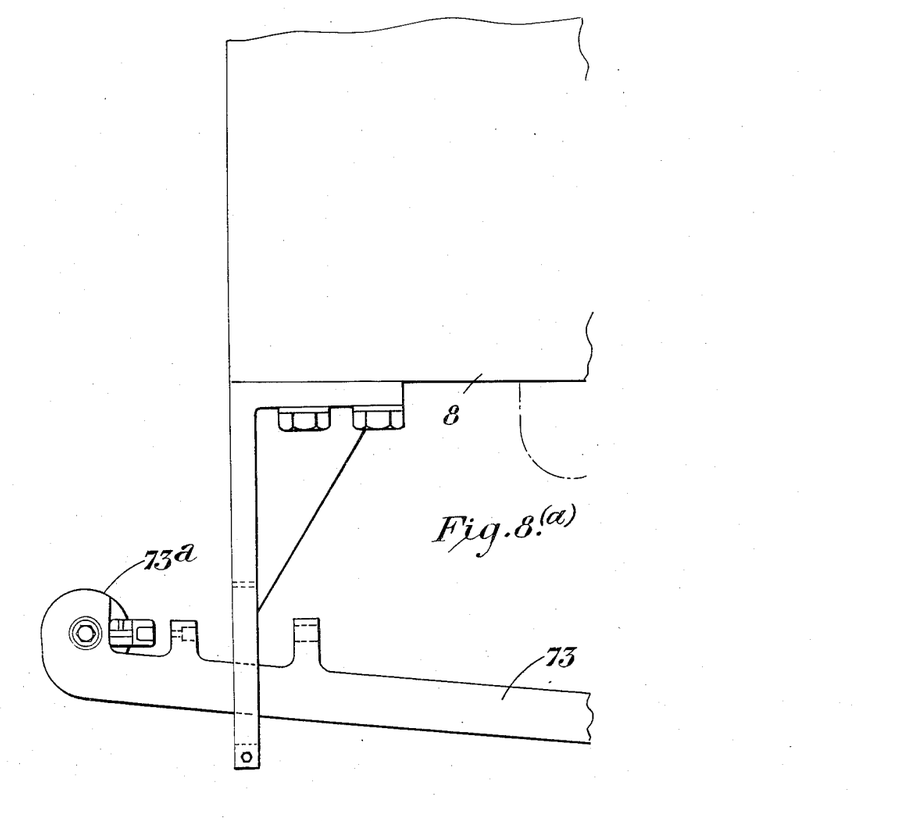
Figure 8B:
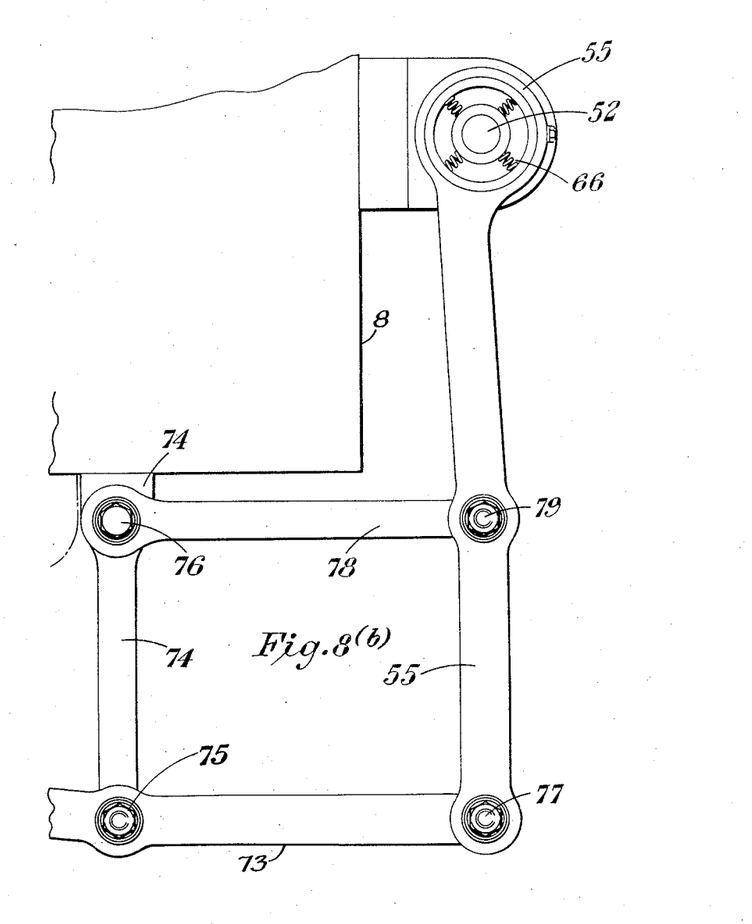

Referring now more particularly to Figures 7, 8a and 8b, there is provided a main operating lever 73 having a handle 73a provided with a movable lever 73b which, when gripped by the operator, pulls a wire or other device 73c (Figs. 6 and 7) and opens the non-return valves 41, 41a. The lever 73 is pivotally mounted intermediate of its ends by a pin 75, to one corner of a pantograph mechanism, including levers 74, 78 and 55 (Figure 8b), the pivot points being shown at 76, 77 and 79. The pivot 76 is carried by the cutter head 8. Due to the provision of this pantograph lever mechanism, the operating lever 73 is thus capable of multi-linear movement, that is to say a movement through 360° in one plane, which the lever 55, one end of which surrounds the spindle 52, to be hereinafter described, will tend to follow.

Figure 9:
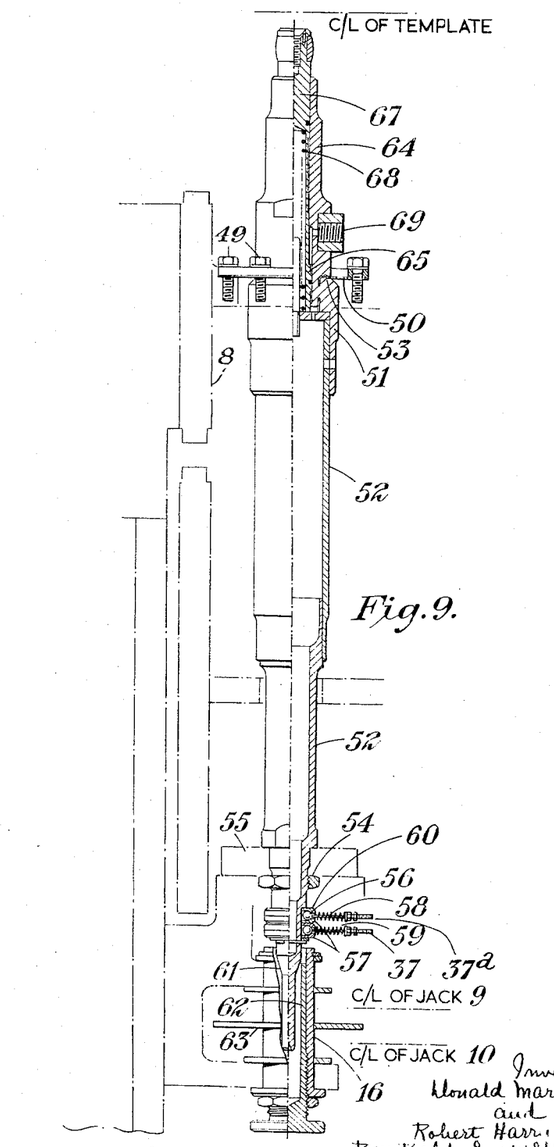

Referring now more especially to Figure 9, fixed to the cutter head 8 by bolts 49 is an outer flange of a steel diaphragm 50, the inner rim of which is crimped as at 53, and is anchored to an upper sleeve 51 carried by the upper end of a follow-up spindle 52. Loosely radially coupled to the spindle 52 by a nut 54 is one end of the lever 55 of the pantograph device, springs 66 (Figure 8b) being interposed between the lever 55 and the spindle 52. The spindle 52 also carries two hollow rings 57 (Figure 9), each ring containing a ball 56 retained by a cover 60. Secured to each ball 56, for example by brazing, is a tension wire 58, and the other ends of these wires are secured respectively to the slide valve pistons 37 and 37a. Compression springs 59 ensure that the wires 58 are always in tension, so that any movement of the balls 56, and therefore of the spindle 52, is transmitted into a proportionate movement of the slide valve 37. Alternatively the slide valve pistons 37 and 37a could be coupled to the follow-up spindle 52 by a stiff ring and a rigid wire.

It will be recollected that operation of the jacks 9, 10 is governed by the slide valves 37, 37a and thus by movement of one or other of the balls 56, tension wire 58, and spring 59; one slide valve, one ball, one tension wire, and one spring are normally provided for each jack. The spindle 52 (Figure 9) is formed with a taper 61 near its lower end, and surrounding this lower end is the spindle 16, which in turn is surrounded by the ends of the piston rods 17 and 15 of the jacks 9 and 10 respectively. Screwed into the spindle 16 is a sleeve 62 which is adapted to co-operate with the taper 61 of the spindle 52, in such a way as to limit any swinging movement of the spindle 52 around its normal axis in relation to the spindle 16, and therefore limit the movement of the slide valves 37, 37a, and hence the speed of movement of the operating jacks 9 and 10.

Due to the mounting of the spindle 52 on the diaphragm 53 fixed to the cutter head 8, a follow-up is obtained. The diaphragm 53 allows swinging movement of the spindle 52 in a plane over 360°, without backlash, which is usually obtained when a spherical joint is used, with the added centralizing effect. The follow-up, of course, is transmitted through the balls 56 onto the pistons of the slide valves 37, 37a without backlash, due to the action of the tension wires 58 and springs 59.

Figure 1A:
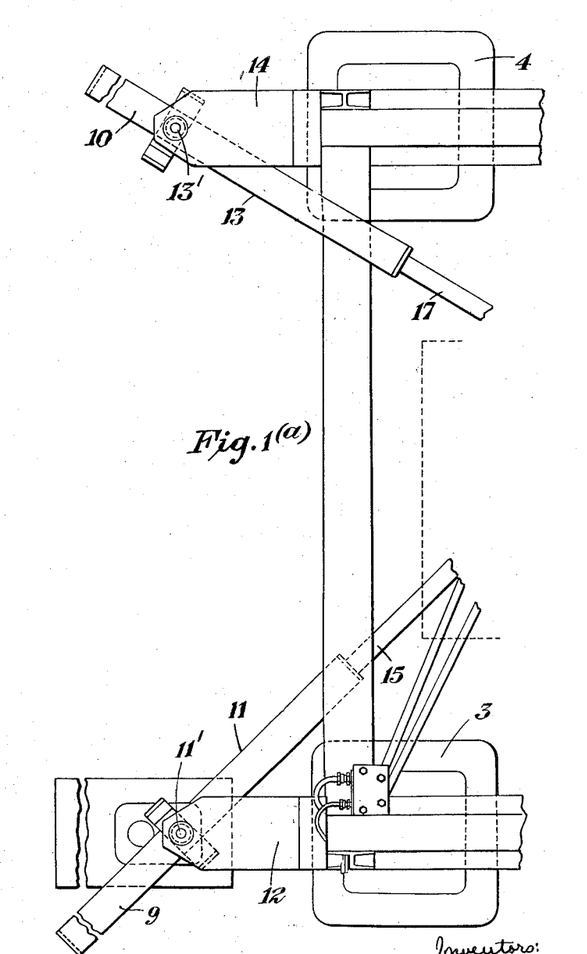
Figure 1B:
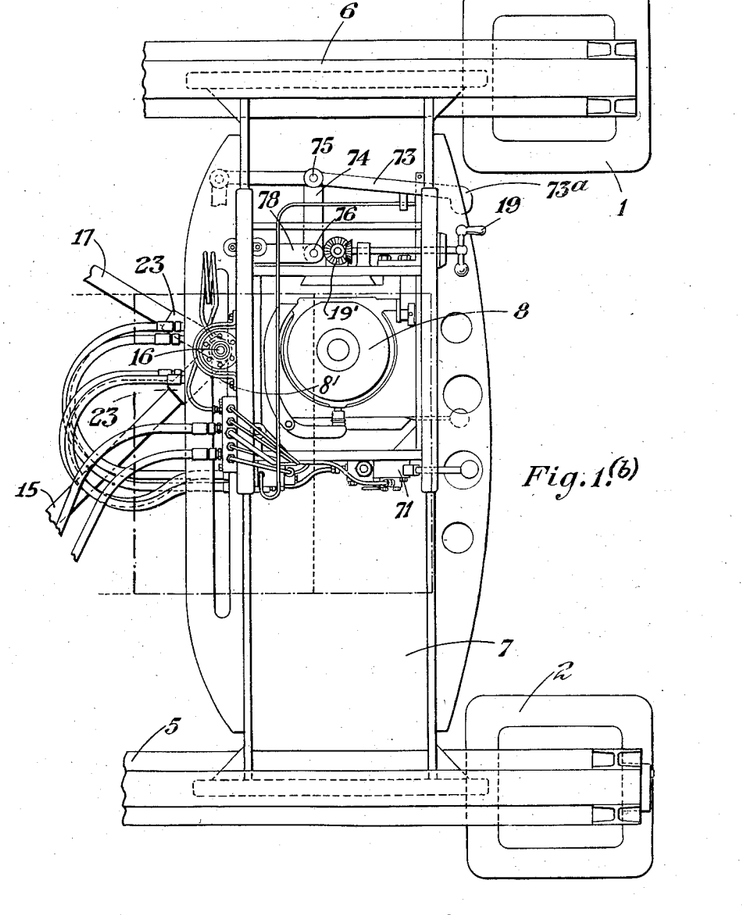
Figure 2A:
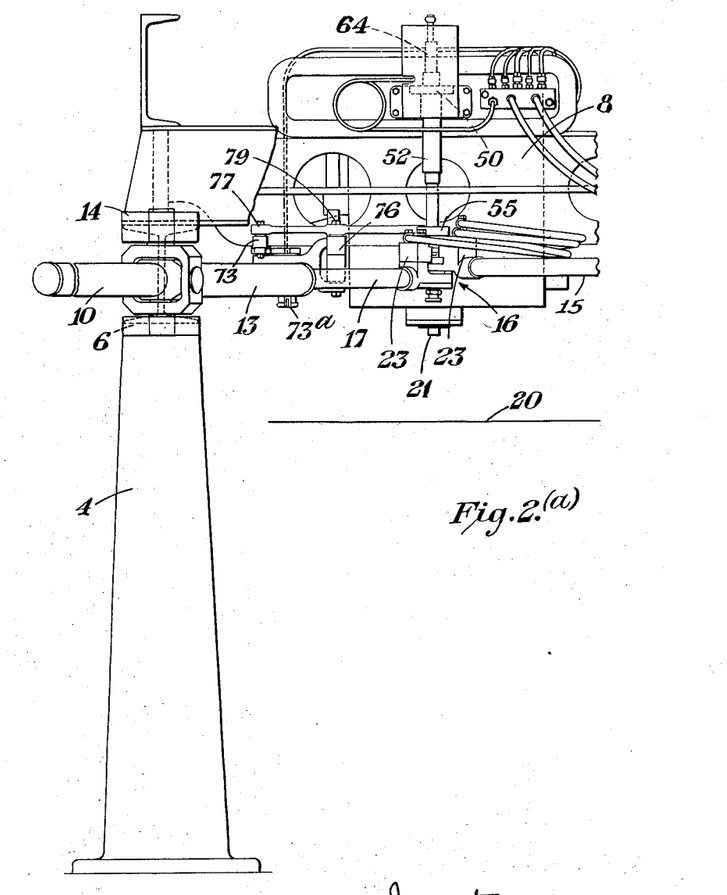
Figure 2B:
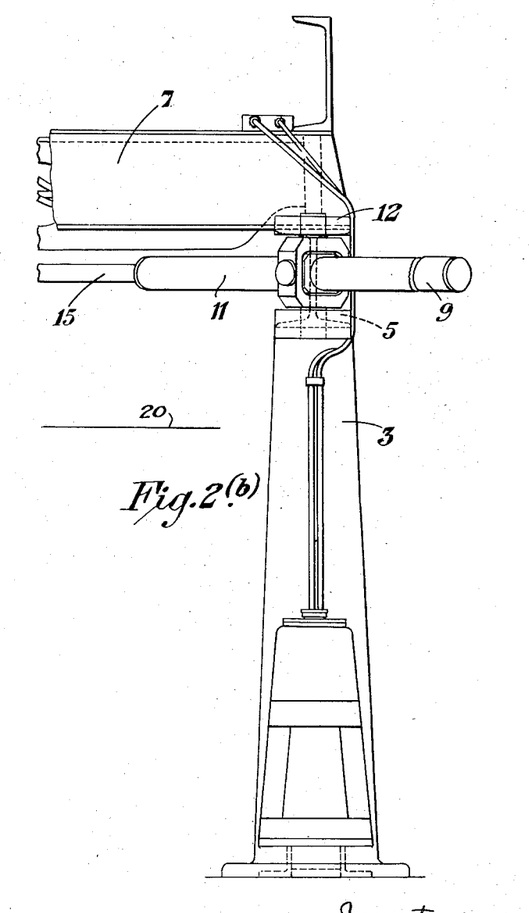
Figure 3:
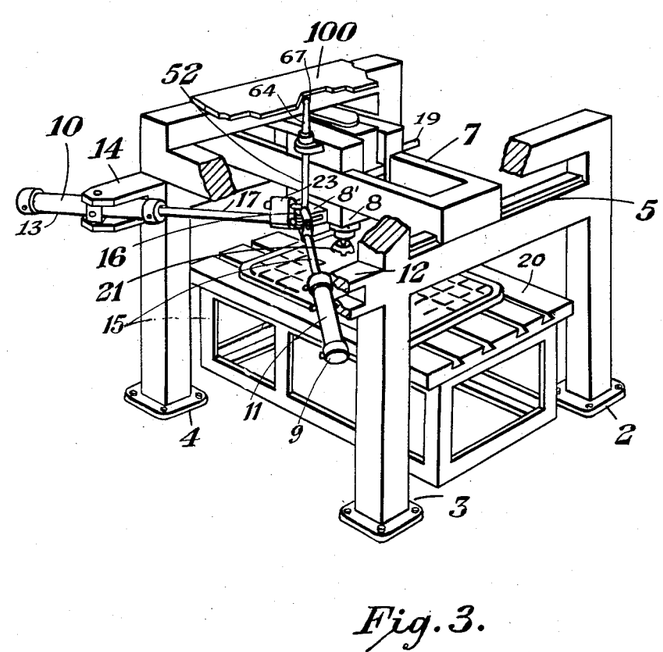

When the machine is to be used in conjunction with a template, such as shown at 100, Figure 3, the upper part of the follow-up mechanism spindle 52 will include a stylus in the form of a cylinder 64 (Figure 9), in which slides a piston 65, having a piston rod 67. A spring 68 is provided to bias the piston 65 and the piston rod 67 upwardly to extend the stylus within the cut-out portions of the template, or alternatively to the outside of the template. If this limitation of movement by the template is not required, or if the top end of the piston rod 67 is to be moved from one cut-out in the template to a neighbouring cut-out, fluid under pressure is admitted into the bore of the cylinder through a connection 69, thus moving the piston 65 downwardly against the spring 68 to the position shown in Figure 9. Admission of such fluid under pressure is controlled by a retraction valve 71 (Figure 6) under manual control.

The sleeve 51, spindle 52, cylinder 64 and piston rod 67 can rock in any direction, due to the flexibility of the diaphragm 50, the outside of which is clamped to the tool carriage 8 by bolts 49. To limit the rocking movement of the spindle 52, the spindle 16 is fixed to the tool carriage and screwed to this spindle 16 is the adjustable stop 62. The rocking movement is limited by the upper corner of the stop 62 limiting the movement of the taper 61 of the spindle 52. If the stop 62 is withdrawn by unscrewing, then greater movement of the spindle 52 is permitted. The spindle 52 carries the valve operating gear 60, 56, 58, 37, 37a and thus, when it is rocked away from the vertical in a given direction, the valves are opened, causing the jacks to move the tool carriage in a corresponding direction. Limitation of the rocking movement of the spindle therefore limits valve travel and hence the maximum speed at which the tool carriage can be moved by the jacks. The spindle is caused to rock by the pantograph arrangement shown in Figures 8a and 8b, so that the tool carriage will be moved by the jacks in the direction in which the control handle 73a is pressed. If it is desired to limit by a template the area within which the machine can be used, then it is arranged that, with the stylus 67 extended, the stylus will contact the edge of the template as the limit of the area is approached and that further movement will cause the stylus to rock in such a direction that the valves are operated so that no further movement can be made towards the template while full control is retained along and away from the template. If manual power is maintained on the control handle 73a so that the stylus is urged towards the template through the pantograph mechanism, then the maximum load which can thus be applied to the stylus spindle and thence transmitted to the template is limited by limiting the movement of the pantograph relative to the tool carriage by the lever 55 contacting the tool carriage 8.

The mechanism works as follows: A component to be machined is placed on the table 20 and the cutting tool on the cutter head 8 put into rotation. Assuming a template to be used, the upper end of the piston rod 67 on the stylus is placed in the appropriate depression of the template. Now the operator grips the "dead man's" handle 73a, thus moving lever 73b to pull wire 73c and opening the non-return valves 41, 41a, so that fluid under pressure can pass from the pump, through the line 40, to the slide valves 37, 37a, and to the jacks 10 and 9. The operator can now move, through the handle 73a, the main operating lever 73 in the required direction, for example to follow the curve of an ellipse. Due to the pantograph mechanism, movement of the lever 73 will cause similar movement of the outer end of the lever 55, which surrounds the follow-up spindle 52, such movement being transmitted mechanically through the pantograph mechanism, and being limited by the clearance between the taper 61 and the inner end of the sleeve 62. As explained above, the clearance between the taper and the sleeve can be adjusted by means of the screw-threaded connection between the sleeve 62 and the spindle 16. Any movement of the follow-up spindle 52 will automatically be followed by a corresponding movement of the pistons of the slide valves 37, 37a. If then the handle 73a is moved over a greater distance than the clearance between the taper 61 and the sleeve 62, the additional load on the pantograph device will be stored in the spring 66 and transmitted on to the follow-up spindle 52 when the cutter head 8 has travelled in the required direction, due to the action of the jacks, as explained below. It will thus be appreciated that a continuous movement can be obtained, the springs 66 ensuring that the force exerted by the stylus on the template is limited.

The effect of the movement of the slide valve pistons will now be explained only in connection with the jack 10, because the effect is identical for both jacks. Once the "dead man's" handle 73a has been gripped to open the non-return valves 41, 41a, fluid under pressure from the pump 38 will pass through the valve 41, flow limiting valve 43, into the connection 24 and from there through the aperture 28, pipe 35, into the cylinder 13 to act on the full area of the piston 36, it being assumed that the slide valve piston has been moved to the left (Figure 5) through operation of the follow-up spindle 52. Fluid under pressure from the pump is continuously applied to the annular area of the piston 36 through the bore 25 via connection 24, but, due to the difference of the area acted upon by the pressure fluid, the piston 36, and therefore the piston rod 17, will be moved to the right (Figure 6) thus closing the aperture 28, and therefore stopping further fluid supply to the full area of the piston 36, after the follow-up. This is obtained in the following manner: The movement of the jack pistons 36 will effect, through the spindle 16, fixed to the cutter head 8, a corresponding movement of the said head on the slides 5, 6, and cross slide 7. If the piston of the slide valve 37 is moved to the right, the aperture 33 (Figure 5) will be connected to the aperture 26, and the continuously applied pressure on the annular area of the piston will close the jack, whilst the fluid under pressure from the full area of the piston 36 will return to tank.

The follow-up spindle 52, as has been stated above, is mounted on the diaphragm 53 fixed to the cutter head, so that a follow-up is obtained.

The rate of movement of the jacks 9, 10 can be further adjusted by adjustment of the flow limiting valves 43, 43a, whilst the pressure relief valve 44 guards against an undue rise of pressure in the hydraulic system.

The mounting of the jacks 9, 10 outside or away from the moving parts, particularly the slides 5, 6 and 7, renders it possible to incorporate the present servo-system on a machine less sturdy, rigid and expensive than proposed hitherto, and reduces the tendency of reproducing any wear of the slides to affect the accuracy of the reproduction.

It will be appreciated that the two jacks themselves are so arranged as to take up substantially the whole torsional and side loads of the member to be moved, so that the machine tool slide and the cross slide need not contain any means for restraining their movement on the machine bed, but serve only as weight-supporting devices, whilst the slide and cross slide could be omitted. It should, however, be understood that the jacks can be mounted on vertically telescopic pillars, or on the walls of a building, or even on horizontal rails, whilst the weight-support for the member to be moved may be arranged either as illustrated in the accompanying drawings, or be in the form of counter-weights, or again the jacks may be so large and rigid that they will support the weight of the cutter head, motor and stylus.

Finally, if it be desired that the member to be moved shall be capable of movement in more than two linear directions then the number of jacks is increased, according to the number of linear movements required, all said jacks acting on the common spindle.

To review generally, it is pointed out, as is apparent from the foregoing, that the cutter head 8 is mounted for conformed movement with movement components in a plane and perpendicular to each other so that the tool 21 may be moved in any direction parallel to the plane of the work piece. The two jacks 9 and 10 are pivotally mounted at 11' and 13' at points spaced from each other parallel to the plane referred to, and the jacks converge upon each other from these points to the common pivot 16 on the cutter head 8. The follow-up spindle 52 is mounted adjacent to one of its ends by a diaphragm 50 for 360 degree orbital sweeping movement of its other end so that the connections 60, 56 and 37 between this other end of the spindle and the slide valves enable operation of the latter conjointly and differentially in response to movement of the spindle 52.

The operating lever is not necessarily operated by hand but may be operated by any mechanical or automatic device.

We claim:

1. A fluid pressure-operated multilinear servo-system for controlling movement of a copying router machine tool, comprising a cutter head; means mounting said cutter head for compound movement with movement components in a plane; two fluid pressure-operated jacks each including a cylinder element and a piston and piston rod element slidable relatively in the associated cylinder element; means respectively pivotally mounting one element of each jack, the pivotal mountings being spaced from each other parallel to said plane; a common pivot on said cutter head; means respectively pivotally connecting the other element of each of said jacks to said common pivot with the lines of action of said jacks converging upon each other from said pivotal mountings to said common pivot; valve means mounted on said jacks for controlling supplying of fluid under pressure to said jacks; a spindle; means connected to said spindle adjacent to one end thereof and mounting said spindle for substantially 360 degree orbital sweeping movement of its other end; and means connected to said spindle between its mounting and its said other end and also connected to said valve means for operating the latter conjointly and differentially in response to movement of said spindle to effect selected compound movement of said cutter head.

2. A construction according to claim 1 including a sleeve mounted for axial adjustment within said common pivot; and a tapered part on said other end of said spindle extending into said sleeve with radial clearance between said tapered part and said sleeve, axial adjustment of said sleeve within said common pivot and relative to said tapered part varying said radial clearance and variably limiting sweeping movement of said spindle other end relative to said common pivot and said tool carrier.

3. A construction according to claim 1 including a follow up device for said valve means comprising a template engageable stylus connected to said spindle and to said valve means.

4. A construction according to claim 3 including a control handle; and means including spring means interposed between and connecting said control handle and said spindle for moving said spindle by operation of said control handle to cause said stylus to follow the template, said spring means limiting the load which can be applied through said stylus to said template.

5. A construction according to claim 4 in which the means connecting said control handle and said spindle includes a dead man's lever on which said control handle is mounted, releasing of said handle and dead man's lever enabling restoring of said spindle and valve means to cause the latter hydraulically to lock said jacks.

References Cited in the file of this patent

UNITED STATES PATENTS

| 672,631 | Tiffany | Apr. 23, 1901 |
| 2,346,820 | Casler et al. | Apr. 18, 1944 |
| 2,403,519 | Gardiner | July 9, 1946 |
| 2,693,737 | Smith | Nov. 9, 1954 |
| 2,723,598 | Mann | Nov. 15, 1955 |

FOREIGN PATENTS

| 741,822 | France | Feb. 21, 1933 |
| 1,072,582 | France | Sept. 14, 1954 |